(12) United States Patent
Souden et al.

(10) Patent No.: US 11,508,388 B1
(45) Date of Patent: Nov. 22, 2022

(54) MICROPHONE ARRAY BASED DEEP LEARNING FOR TIME-DOMAIN SPEECH SIGNAL EXTRACTION

(71) Applicant: Apple Inc., Cupertino, CA (US)

(72) Inventors: Mehrez Souden, Los Angeles, CA (US); Symeon Delikaris Manias, Cupertino, CA (US); Joshua D. Atkins, Los Angeles, CA (US); Ante Jukic, Los Angeles, CA (US); Ramin Pishehvar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 17/100,802

(22) Filed: Nov. 20, 2020

Related U.S. Application Data

(60) Provisional application No. 62/939,528, filed on Nov. 22, 2019.

(51) Int. Cl.
*G10L 21/0232* (2013.01)
*H04R 1/40* (2006.01)
*G10L 25/30* (2013.01)
*G06N 3/08* (2006.01)
*H04R 3/00* (2006.01)
*G10L 21/0216* (2013.01)

(52) U.S. Cl.
CPC ............ *G10L 21/0232* (2013.01); *G06N 3/08* (2013.01); *G10L 25/30* (2013.01); *H04R 1/406* (2013.01); *H04R 3/005* (2013.01); *G10L 2021/02166* (2013.01)

(58) Field of Classification Search
CPC ................ G10L 21/0232; G10L 25/30; G10L 2021/02166; G10L 25/78; G10L 21/0216; G10L 21/028; G10L 21/0224; G10L 21/038; G10L 21/0364; G10L 15/20; G06N 3/08; H04R 1/406; H04R 3/005
See application file for complete search history.

(56) References Cited

U.S. PATENT DOCUMENTS

2017/0278513 A1* 9/2017 Li ........................... G10L 15/20
2019/0172476 A1 6/2019 Wung et al.
(Continued)

OTHER PUBLICATIONS

Luo, et al., "Conv-TasNet: Surpassing ideal Time-Frequency Magnitude Masking for Speech Separation," May 2019, retrieved from https://arxiv.org/pdf/1809.07454.pdf, 12 pages.
(Continued)

*Primary Examiner* — Yogeshkumar Patel
(74) *Attorney, Agent, or Firm* — BakerHostetler

(57) ABSTRACT

A device for processing audio signals in a time-domain includes a processor configured to receive multiple audio signals corresponding to respective microphones of at least two or more microphones of the device, at least one of the multiple audio signals comprising speech of a user of the device. The processor is configured to provide the multiple audio signals to a machine learning model, the machine learning model having been trained based at least in part on an expected position of the user of the device and expected positions of the respective microphones on the device. The processor is configured to provide an audio signal that is enhanced with respect to the speech of the user relative to the multiple audio signals, wherein the audio signal is a waveform output from the machine learning model.

20 Claims, 14 Drawing Sheets

(56) References Cited

U.S. PATENT DOCUMENTS

2019/0206417 A1* 7/2019 Woodruff .............. G10L 21/028
2019/0222943 A1* 7/2019 Andersen ............. H04R 25/507
2019/0325887 A1* 10/2019 Karkkainen ..... G10K 11/17827

OTHER PUBLICATIONS

Rethage, et al., "A wavenet for speech denoising," Jan. 2018, retrieved from https://arxiv.org/pdf/1706.07162.pdf, 11 pages.
Takahashi, et al., "Recursive speech separation for unknown number of speakers," Sep. 2019, retrieved from https://www.isca-speech.org/archive/Interspeech_2019/pdfs/1550.pdf, 5 pages.

* cited by examiner

MICROPHONE ARRAY BASED DEEP LEARNING FOR TIME-DOMAIN SPEECH SIGNAL EXTRACTION

CROSS REFERENCE TO RELATED APPLICATIONS

This application claims the benefit of U.S. Provisional Patent Application No. 62/939,528, entitled "Microphone Array Based Deep Learning for Time-Domain Speech Signal Extraction," filed on Nov. 22, 2019, the disclosure of which is hereby incorporated herein in its entirety.

TECHNICAL FIELD

The present description relates generally to processing audio signals, including enhancing user speech in a time-domain audio signal.

BACKGROUND

An electronic device may include multiple microphones. The multiple microphones may produce audio signals which include sound from a source, such as a user speaking to the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
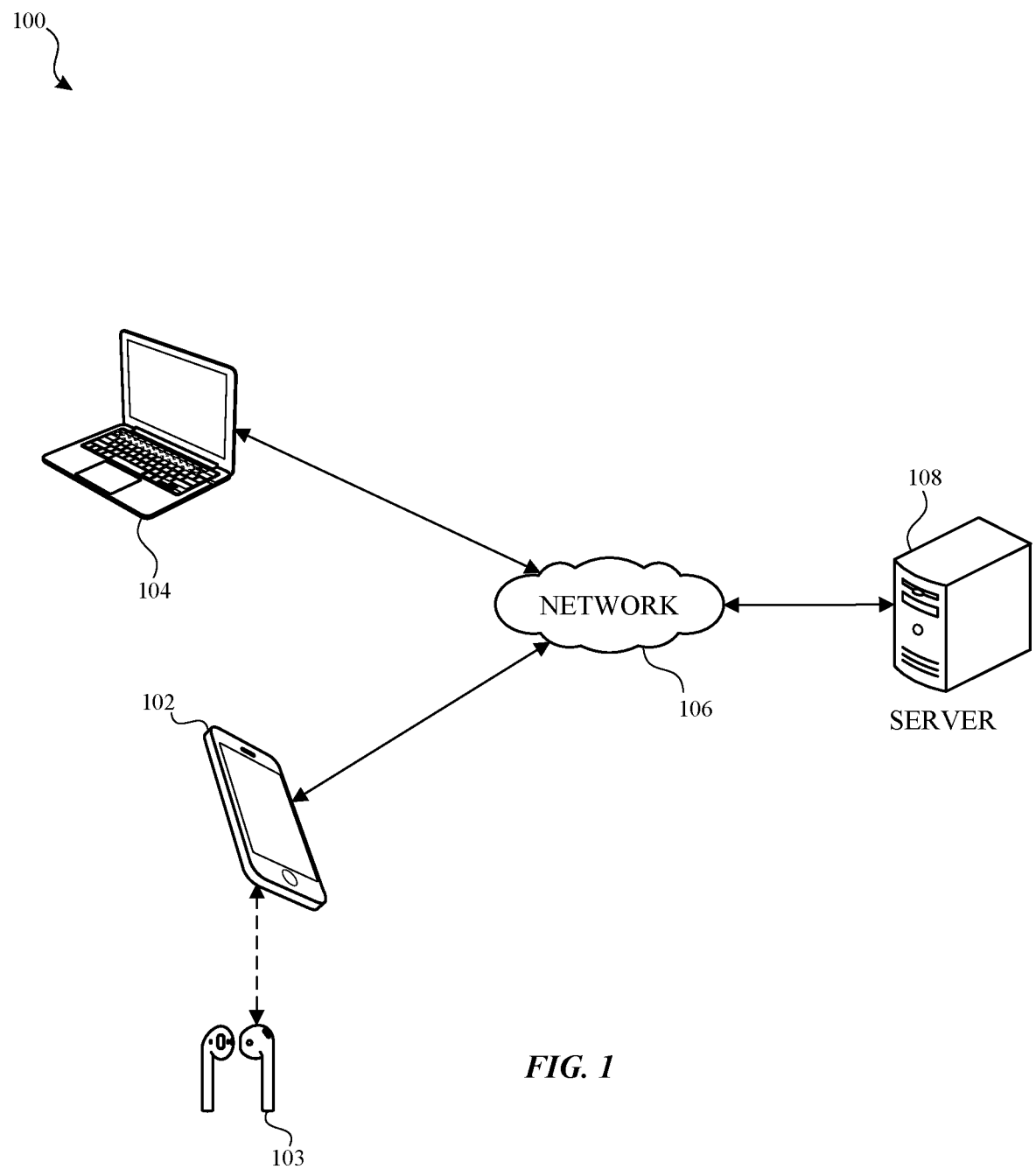
FIG. 1 illustrates an example network environment for outputting an enhanced time-domain speech of a user in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device may include multiple microphones. The microphones may produce audio signals. The audio signals may contain sounds from one or more sound sources. Examples of the sound sources may include, but are not limited to, a user of the device who is speaking to the device, a bystander who is not the user of the device but whose voice may be captured by the microphones of the device, and/or background noise (e.g., appliance noise, wind, traffic, and the like). The speech of the user captured by one or more microphones of the device may be interfered with by one or more other sound sources, resulting in noisy speech signals captured by the one or more microphones of the device. The noisy speech signals may degrade performance of applications based on speech, such as assistive hearing applications, augmented hearing applications, telephony applications, voice assistance applications, augmented reality applications, computer-generated reality applications, and the like.

The subject system provides for enhancing a device user's speech by constructing a time-domain output audio signal based on time-domain input audio signals captured by device microphones. The subject system utilizes a machine learning model to output an audio signal enhanced with respect to the speech of the user relative to audio data of the multiple time-domain audio signals captured by the device microphones and provided as inputs to the model. The machine learning model may have been trained with varying temporal, spectral, and for a given known spatial location of the different input audio signals, and to optimize a cost function to output an audio signal in time-domain with enhanced speech of a user of the device relative to a given spatial location. By using the one or more machine learning models as described herein, it is possible for the device to receive raw audio signals in the time-domain, captured by one or more microphones of the device, and output an audio signal as a waveform in the time-domain that is enhanced with respect to speech of a user to improve performance of, for example, assistive hearing applications, augmented hearing applications, telephony applications, voice assistance applications, augmented reality applications, computer-generated reality applications, and the like.

FIG. 1 illustrates an example network environment 100 for processing audio signals to enhance speech output in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102 and 104, a wireless audio input/output device 103, a network 106, and a server 108. The network 106 may communicatively (directly or indirectly) couple, for example, one or more of the electronic devices 102, 104, and/or the server 108. In FIG. 1, the wireless audio input/output device 103 is illustrated as not being directly coupled to the network 106; however, in one or more implementations, the wireless audio input/output device 103 may be directly coupled to the network 106.

The network 106 may be an interconnected network of devices that may include, or may be communicatively coupled to, the Internet. In one or more implementations, connections over the network 106 may be referred to as wide area network connections, while connections between the electronic device 102 and the wireless audio input/output device 103 may be referred to as peer-to-peer connections. For explanatory purposes, the network environment 100 is illustrated in FIG. 1 as including two electronic devices 102 and 104, a single wireless audio input/output device 103, and a single server 108; however, the network environment 100 may include any number of electronic devices, wireless audio input/output devices and/or servers.

The server 108 may be, and/or may include all or part of the electronic system discussed below with respect to FIG. 7. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers. The sever 108 may be configured to train and/or generate one or more machine learning models described herein. The server 108 may be configured to transmit the trained, generated, and/or updated machine learning models to the devices 102, 103, and 104 for provisioning of machine learning models on the devices 102, 103, and 104.

One or more of the electronic devices 102, 104 may be, for example, a portable computing device such as a laptop computer, a smartphone, a peripheral device (e.g., headphones, earbuds, wireless and the like), a tablet device, a set-top box, a content streaming device, a wearable device such as a smartwatch, and the like, or any other appropriate device that includes audio input circuitry (e.g., one or more microphones), audio output circuitry (e.g., one or more speakers), and/or one or more wireless interfaces, such as one or more near-field communication (NFC) radios, WLAN radios, Bluetooth radios, Zigbee radios, cellular radios, and/or other wireless radios. In FIG. 1, by way of example, the electronic device 102 is depicted as a smartphone, and the electronic device 104 is depicted as a laptop computer. Each of the electronic devices 102 and 104 may be, and/or may include all or part of, the electronic device discussed below with respect to FIG. 2, and/or the electronic system discussed below with respect to FIG. 7.

The wireless audio input/output device 103 may be, for example, a wireless headset device, wireless headphones, one or more wireless earbuds (or any in-ear, against the ear or over-the-ear device), or generally any device that includes audio input circuitry (e.g., one or more microphones), audio output circuitry (e.g., one or more speakers), and/or one or more wireless interfaces, such as near-field communication (NFC) radios, WLAN radios, Bluetooth radios, Zigbee radios, and/or other wireless radios. In FIG. 1, by way of example, the wireless audio input/output device 103 is depicted as a set of wireless earbuds.

As is discussed further below, one or more of the electronic devices 102, 104 and/or the wireless audio input/output device 103 may include one or more microphones that may be used, in conjunction with the architectures/components described herein, for receiving audio signals as inputs to a machine learning model trained to output an audio signal enhanced with respect to the speech of the user of the electronic devices. The wireless audio input/output device 103 may be, and/or may include all or part of, the wireless audio input/output device discussed below with respect to FIG. 2, and/or the electronic system discussed below with respect to FIG. 7.

In one or more implementations, the wireless audio input/output device 103 may be paired, such as via Bluetooth, with the electronic device 102 (e.g., or with the electronic devices 104). After the two devices 102 and 103 are paired together, the devices 102 and 103 may automatically form a secure peer-to-peer connection when located proximate to one another, such as within Bluetooth communication range of one another. The electronic device 102 may stream audio, such as music, phone calls, and the like, to the wireless audio input/output device 103. For explanatory purposes, the subject technology is described herein with respect to a wireless connection between the electronic device 102 and the wireless audio input/output device 103. However, the subject technology can also be applied to a wired a connection between the electronic device 102 and the wireless audio input/output device 103.

Figure 2:
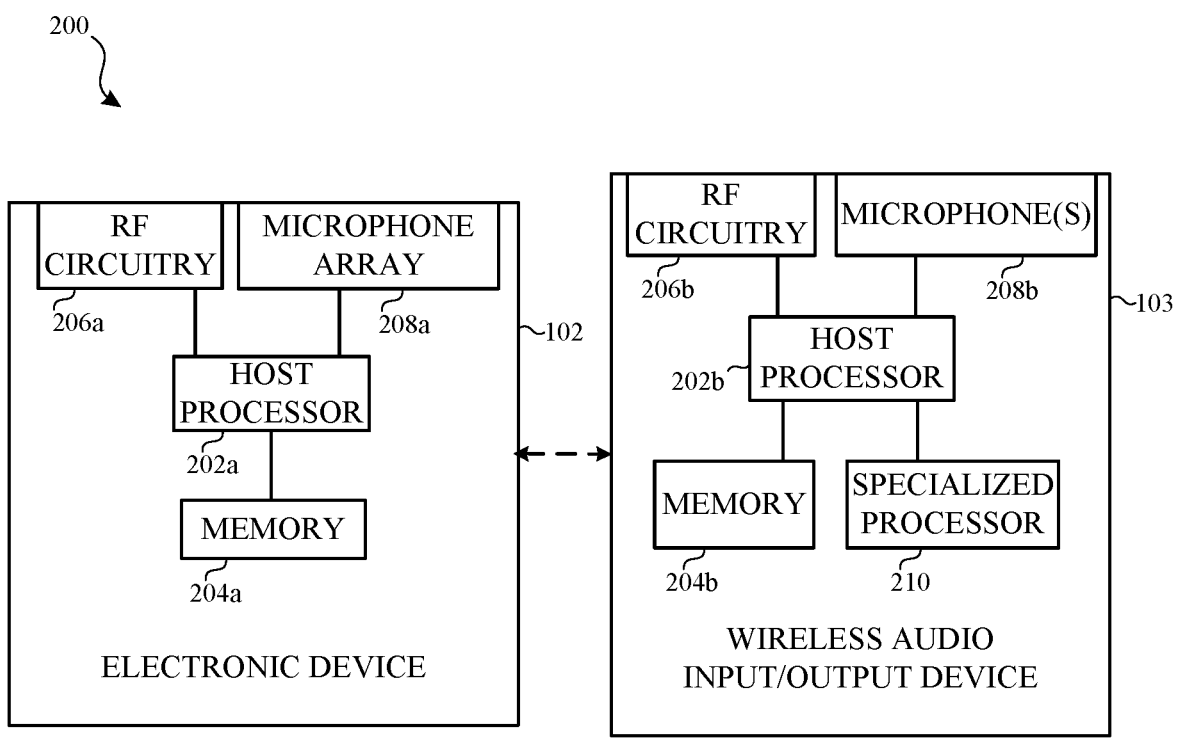
FIG. 2 illustrates an example network environment including an example electronic device and an example wireless audio input/output device in accordance with one or more implementations.

FIG. 2 illustrates an example network environment 200 including an example electronic device 102 and an example wireless audio input/output device 103 in accordance with one or more implementations. The electronic device 102 is depicted in FIG. 2 for explanatory purposes; however, one or more of the components of the electronic device 102 may also be implemented by other electronic device(s) (e.g., the electronic device 104). Similarly, the wireless audio input/output device 103 is depicted in FIG. 2 for explanatory purposes; however, one or more of the components of the wireless audio input/output device 103 may also be implemented by other device(s) (e.g., a headset and/or headphones). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202a, a memory 204a, radio frequency (RF) circuitry 206a, and/or a microphone array 208a comprising one or more microphones. The wireless audio input/output device 103 may include one or more processors, such as a host processor 202b and/or a specialized processor 210. The wireless audio input/output device 103 may further include a memory 204b, RF circuitry 206b and/or a microphone array 208b comprising one or more microphones. While the network environment 200 illustrates microphone arrays 208a-b, it is possible for other types of a sensor(s) to be used instead of, or addition to, microphone(s) (e.g., other types of sound sensor(s), an accelerometer, a gyroscope, and the like).

The RF circuitries 206a-b may include one or more antennas and one or more transceivers for transmitting/receiving RF communications, such as WiFi, Bluetooth, cellular, and the like. In one or more implementations, the RF circuitry 206a of the electronic device 102 may include circuitry for forming wide area network connections and peer-to-peer connections, such as WiFi, Bluetooth, and/or cellular circuitry, while the RF circuitry 206b of the wireless audio input/output device 103 may include Bluetooth, WiFi, and/or other circuitry for forming peer-to-peer connections.

The host processors 202a-b may include suitable logic, circuitry, and/or code that enable processing data and/or controlling operations of the electronic device 102 and the wireless audio input/output device 103, respectively. In this regard, the host processors 202a-b may be enabled to provide control signals to various other components of the electronic device 102 and the wireless audio input/output device 103, respectively. Additionally, the host processors 202*a-b* may enable implementation of an operating system or may otherwise execute code to manage operations of the electronic device 102 and the wireless audio input/output device 103, respectively. The memories 204*a-b* may include suitable logic, circuitry, and/or code that enable storage of various types of information such as received data, generated data, code, and/or configuration information. The memories 204*a-b* may include, for example, random access memory (RAM), read-only memory (ROM), flash, and/or magnetic storage.

In one or more implementations, a given electronic device, such as the wireless audio input/output device 103, may include a specialized processor (e.g., the specialized processor 210) that may be always powered on and/or in an active mode, e.g., even when a host/application processor (e.g., the host processor 202*b*) of the device is in a low power mode or in an instance where such an electronic device does not include a host/application processor (e.g., a CPU and/or GPU). Such a specialized processor may be a low computing power processor that is engineered to utilize less energy than the CPU or GPU, and also is designed, in an example, to be running continuously on the electronic device in order to collect audio and/or sensor data. In an example, such a specialized processor can be an always on processor (AOP), which may be a small and/or low power auxiliary processor. In one or more implementations, the specialized processor 210 can be a digital signal processor (DSP).

The specialized processor 210 may be implemented as specialized, custom, and/or dedicated hardware, such as a low-power processor that may be always powered on (e.g., to collect and process audio signals provided by the microphone(s) of the microphone array 208*b*), and may continuously run on the wireless audio input/output device 103. The specialized processor 210 may be utilized to perform certain operations in a more computationally and/or power efficient manner. In an example, the specialized processor 210 may implement a system for enhanced speech output, as described herein. In one or more implementations, the wireless audio input/output device 103 may only include the specialized processor 210 (e.g., exclusive of the host processor 202*b*).

One or more of the microphones of the microphone arrays 208*a-b* may include one or more external microphones, one or more internal microphones, or a combination of external microphone(s) and/or internal microphone(s). In one or more implementations, different geometries may be used for the different microphone arrays 208*a-b*. For example, the one or more microphones of the microphone arrays 208*a-b* may be placed at different positions on and/or in the respective devices 102 and 103. As discussed further below with respect to FIGS. 3-6, one or more of the devices 102 and 103 may be configured to implement a system for outputting a time-domain audio signal enhanced with respect to speech of user relative to other audio data present in the multiple input audio signals, where the system processes input audio signals provided by the respective one or more microphones of the microphone array 208*a* or 208*b*.

In one or more implementations, one or more components of the host processors 202*a-b*, the memories 204*a-b*, the RF circuitries 206*a-b*, the microphones of the microphone arrays 208*a-b*, and/or the specialized processor 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
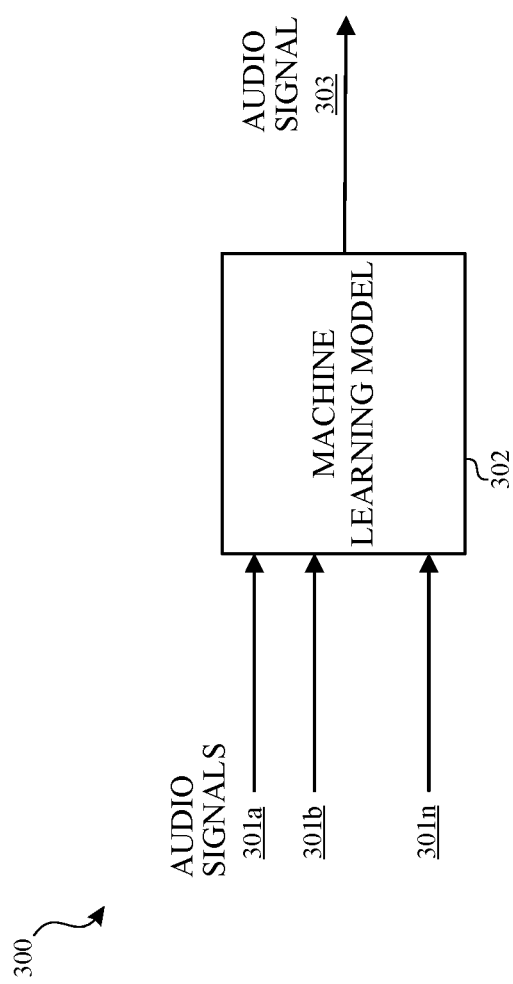
FIG. 3 illustrates a block diagram of an example architecture for outputting an enhanced time-domain speech of a user in accordance with one or more implementations.

FIG. 3 illustrates a block diagram of an example architecture 300 for providing an output audio signal comprising a time-domain waveform based on multiple input audio signals comprising time-domain waveforms. For explanatory purposes, the architecture 300 is primarily described herein as being implemented by the electronic device 102 of FIG. 1. However, the architecture 300 is not limited to the electronic device 102 of FIG. 1, and may be implemented by one or more other components and other suitable devices (e.g., the wireless audio input/output device 103). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 300 may include a machine learning model 302, and may provide for receiving multiple input audio signals 301*a*, 301*b*, . . . 301*n*, collectively referred to as input audio signals 301, and outputting an enhanced output audio signal 303. Each of the input audio signals 301 may be a time-domain waveform, and may correspond to audio signals provided by a microphone array of the device 102, such as the microphone array 208*a*. In one or more implementations, the input audio signals 301 includes audio data of speech of a speaker of interest, such as speech of a user of the device, audio data of interfering speech, such as speech of a bystander, audio data of background noise, such as environmental and/or appliance noise, and other audio data.

The output audio signal 303 is a time-domain waveform. The output audio signal 303 is the enhanced speech of a speaker of interest, for example, a user of the electronic device 102. In one or more implementations, the output audio signal 303 may include voice and/or speech of the user of the electronic device 102 exclusive of other audio data present in the received input audio signals 301. The output audio signal 303 may be provided as an output of the machine learning model 302.

The machine learning model 302 may be configured to receive one or more values and/or signals as inputs, such as the input audio signals 301. The machine learning model 302 is configured to receive the input audio signals 301 in the time-domain without conversion or transformation into a different domain (e.g., the frequency domain) prior to being provided as an input to the machine learning model 302. For example, the input audio signals 301 may be raw audio data captured/recorded by the microphones of the electronic device 102.

As described above, the machine learning model 302 may be configured to generate the output audio signal 303 that is enhanced with respect to the speech of a speaker of interest (e.g., a user of the device 102) relative to other audio data present in the input audio signals 301. To enhance the output audio signal 303 with the respect to the speech of the speaker of interest, the machine learning model 302 may be configured to filter out audio data not comprising the speech of the speaker of interest from the input audio signals 301 and generate the output audio signal 303 based on the filtered audio data from the input audio signals 301. The machine learning model 302 maybe configured to extract the speech of the speaker of interest in the input audio signals 301 based on an expected position of the speaker (e.g., expected position of the speaker relative to one or more microphones of the microphone array 208a), expected positions of the microphones of microphone array 208a in the electronic device 102, and/or the temporal and spectral properties of the input audio signals 301. In this regard, the machine learning model 302 may be trained based on expected positions of the microphones and/or a geometry of the microphone array 208a of the electronic device to determine an expected position of a speaker of interest (e.g., expected positon of the user the electronic device 102) relative to the geometry and/or expected positions of the microphones of the microphone array 208a.

In one or more implementations, the machine learning model 302, to output the output audio signal 303, may be configured to transform the raw microphone captured audio data of the input audio signals 301 from the time-domain into a different transform domain. The machine learning model 302 may be configured to transform the raw audio data of the input audio signals 301 into a different transform domain based on the raw audio data and/or on the application for which the output audio signal 303 may be utilized. For example, the machine learning model 302 may transform the input audio data differently if the output audio signal 303 is used in an automatic speech recognition (ASR) application than if the output audio signal 303 is used in an augmented reality application. In this manner, the machine learning model 302 may efficiently separate the input audio signals 301 in a manner to output an output audio signal 303 that is optimized for that application's cost function of the machine learning model 302

Additionally, by being configured to transform the raw audio data of the input audio signals 301 in the manner described above, the machine learning model 302 is not limited to applying only predetermined transform functions (e.g., short-time Fourier transform, and the like), which may degrade the resolution and/or quality of the output audio signal 303 and prevent outputting of a high resolution output audio signal 303. Additional details of transforming the raw audio data of the input audio signals 301 are described below with reference to FIG. 4.

The transformed audio data of the input audio signals 301 may be of a different dimension. The raw audio data of the input audio signals 301 is transformed by the analysis network 401 using a set of convolutional filters and the resulting signal of the input audio signals 301, referred to as latent signal, is fed to a extraction network 402 of the machine learning model 302, which is configured to generate masks based on the latent signal representation of the input audio signals 301. The generated masks may be configured to filter speech of the speaker of interest from the audio data of the input audio signals 301 when the transformed data of the input audio signals 301 is combined with the masks. The output of the combination of the transformed data of the input audio signals 301 with the masks may include speech of the speaker of interest. In one or more implementations, the machine learning model 302 may be configured to transform the output of such combination into a time-domain waveform, and the machine learning model 302 may be configured to generate and/or output the output audio signal 303 comprising the time-domain waveform.

In one or more implementations, the machine learning model 302 may have been trained (e.g., during a training phase) in a supervised manner (e.g., supervised deep learning) on the server 108. For example, on the server 108, the machine learning model 302 may have been trained with ground truth training examples and human verification of output audio signals that are enhanced with speech of a speaker of interest (e.g., user of the electronic device). During the training phase, for example, the machine learning model 302 may have been trained with clean target speech signals of speakers of interest and/or users of the electronic device 102, along with spatial, temporal, and spectral information of the target speech signals.

The machine learning model 302 may have been further trained by providing different speech signals mixed with different noise signals, and/or different interfering talkers, as well as different environments (e.g., different room configurations). In this manner, the machine learning model 302 may be trained with varying temporal, spectral, and spatial input information of different input audio signals in waveform domain, and be trained to optimize a cost function to output audio signals with enhanced speech of speaker of interest. The cost functions may be configured to maximize various speech signal metrics including, but not limited to, signal-to-distortion ratio (SDR), signal-to-interference ratio (SIR), signal-to-noise ratio enhancement (SNRE), signal-to-artifacts ratio (SAR), short-time objective intelligibility (STOI), perceptual evaluation of speech quality (PESQ), automatic speech recognition (ASR), and the like.

In one or more implementations, the cost function may be dependent upon application in which the output audio signal 303 will be used. For example, the machine learning model 302 may be trained and configured to optimize an ASR based cost function if the output audio signal 303 is used to detect whether a key phrase is spoken by the speaker of interest (e.g., user of the electronic device 102). Similarly, the machine learning model 302 may be trained and configured to optimize a cost function based on SDR if the output audio signal 303 is used in an application configured to receive an audio signal with a threshold SDR.

As described above, the machine learning model is not configured to apply a predetermined transform function (e.g., a Fourier transform, and the like) to the raw audio data of the input audio signals. Instead, during the training phase, the machine learning model 302 may be trained to transform the raw audio data of the input audio signals into a different transform domain based on the raw audio data of the input audio signals and by optimizing the cost function of the machine learning model 302 (e.g., the cost function for an application for which the output audio signal of the machine learning model 302 may be utilized). In this manner, the machine learning model 302 may learn to automatically transform input audio data from the time-domain into a transform domain that allows for more efficient separation of the input audio signals and provide a high resolution output audio signal optimized for use by the application.

In being trained to optimize the cost function, the machine learning model 302 may be configured to automatically learn to transform the audio data of the input audio signals from the time-domain into a more optimal domain to efficiently separate the input audio signals, generate filter masks to filter speech of the speaker of interest from the transformed audio data of the input audio signals, and provide the output audio signal 303 enhanced with speech of the speaker of interest with respect to other audio data of the input audio signals 301. In one or more implementations, the machine learning model 302 may be, or may include, a deep neural network (DNN), and/or any other neural network.

As such, the architecture 300 may provide for outputting a time-domain audio signal comprising enhanced speech of speaker of interest with respect to the other audio data present in the received time-domain audio signals. In one or more implementations, one or more components of the machine learning models 302 may be implemented as software instructions, stored in a memory of the electronic device 102 (e.g., memory 204a), which when executed by the host processor 202a, cause the host processor 202a to perform particular function(s). In one or more implementations, one or more components of the machine learning model 302 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), software (e.g., subroutines and code), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

As described above, the machine learning model 302 may be configured as a multi-channel audio processing network. In one or more implementations, architecture of the machine learning model 302 may include multiple networks and/or sub-networks, where each network and/or sub-network may be configured to output intermediate data to provide as an input to another network and/or sub-network. Additional details of the networks and/or sub-networks of an example architecture of the machine learning model 302 are described below with reference to FIGS. 4A-5.

Figure 4A:
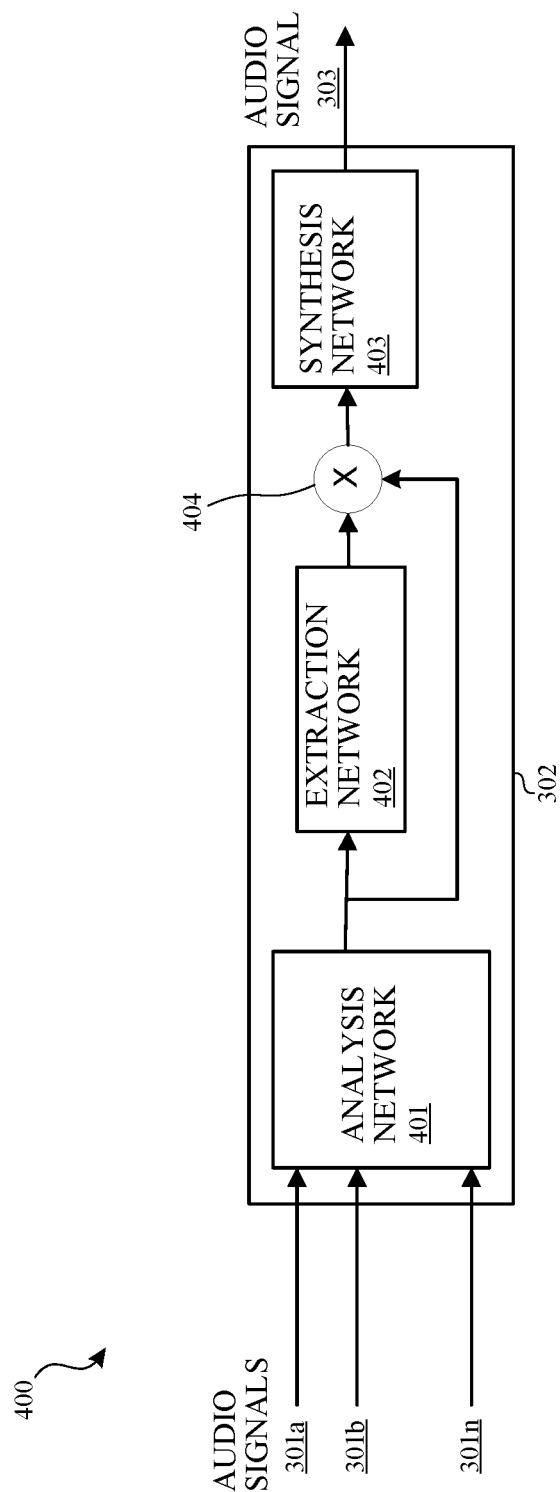
FIGS. 4A-4F illustrate block diagrams of example architectures for outputting an enhanced time-domain speech of a user in accordance with one or more implementations.

FIG. 4A illustrates a block diagram of an example architecture 400 of a machine learning model configured for processing audio signals in time-domain to output a time-domain audio signal enhanced with speech of a speaker of interest in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 400 may include the machine learning model 302. In one or more implementations, the machine learning model 302 may include an analysis network 401, an extraction network 402, a synthesis network 403, and a combination network 404. The architecture 400 may provide for receiving input audio signals 301, and for outputting an output audio signal 303 with speech of a speaker of interest enhanced with respect to other audio data in the input audio signals 301.

Figure 4B:
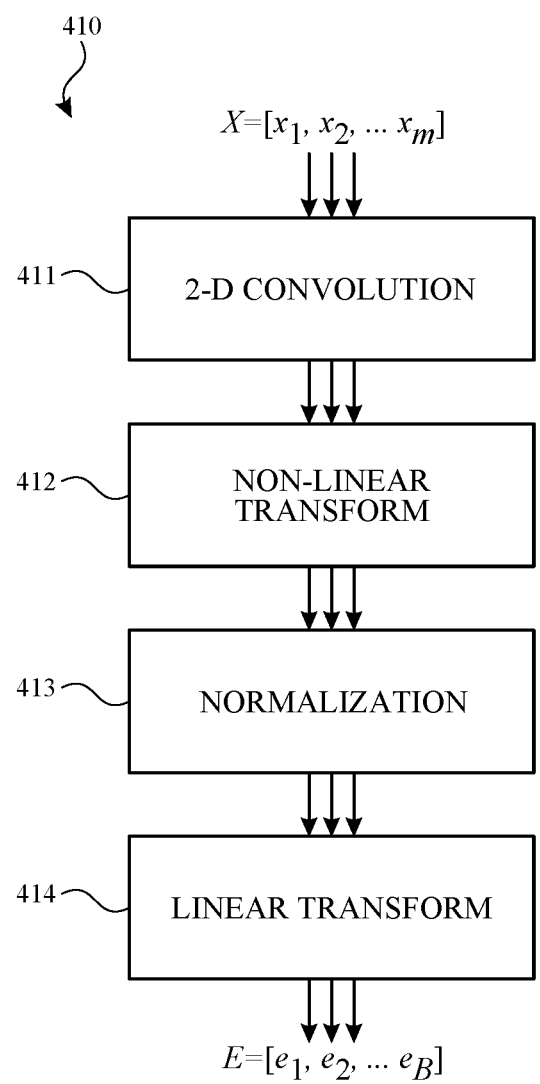

At the analysis network 401, the machine learning model 302 receives the input audio signals 301 in the time-domain, and transforms the raw audio data of the input audio signals 301 into a different domain from the time-domain, as described above with reference to FIG. 3. An example architecture 410 of the analysis network 401 is shown in FIG. 4B. The architecture 410 of the analysis network 401 may include one or more input 2-D convolution layers 411, one or more non-linear transformation layers 412, one or more normalization layers 413, and one or more linear transformation layers 414.

At the input 2-D convolution layers 411, the machine learning model 302 may have been trained to perform 2-D convolution operations on the raw audio data of the input audio signals 301, represented by $X=[x_1, x_2, \ldots x_m]$, where $x_m=[x_m(1), \ldots x_m(T)]^T$ represents the raw audio data in the time-domain of the $m^{th}$ microphone of the microphone array 208a for T time periods. The machine learning model 302 may perform the convolution operations on the raw audio data of the input audio signals 301, $X=[x_1, x_2, \ldots x_m]$, using N number of filters of size M×L, where M is the number of the input audio signals 301. By performing the convolution operations on the raw audio data $X=[x_1, x_2, \ldots x_m]$ of the different microphones of the microphone array 208a, the machine learning model 302 is trained on and learns the correlations between the different input audio signals 301. Additionally, in this manner, the machine learning model 302 utilizes the spatial, temporal, and spectral characteristics of the input audio signals 301 to transform the raw audio data of the input audio signals 301 into a different domain, and performs beamforming and spectral analysis jointly.

In one or more implementations, the machine learning model 302 has N sets of filter coefficients, which are learned during the training of the machine learning model 302 in an offline session (e.g., during a training phase) and represented herein as $H_1, H_2, \ldots H_N$. At the non-linear transformation layer(s) 412, the machine learning model 302 applies a non-linear activation function after convolution operations using $H_1, H_2, \ldots H_N$. At the normalization layer(s) 413, the machine learning model 302 applies a normalization function to normalize the values of the output signals at the output of this operation. At the linear transformation layer(s) 414, the machine learning model 302 may apply a linear function to transform the result of the normalization, resulting in the transformed audio data of the input audio signals 301 of dimension B, represented by $E=[e_1, e_2, \ldots e_B]$. The transformed audio data, $E=[e_1, e_2, \ldots e_B]$, of the input audio signals 301 is provided as an input to the extraction network 402.

Figure 4C:
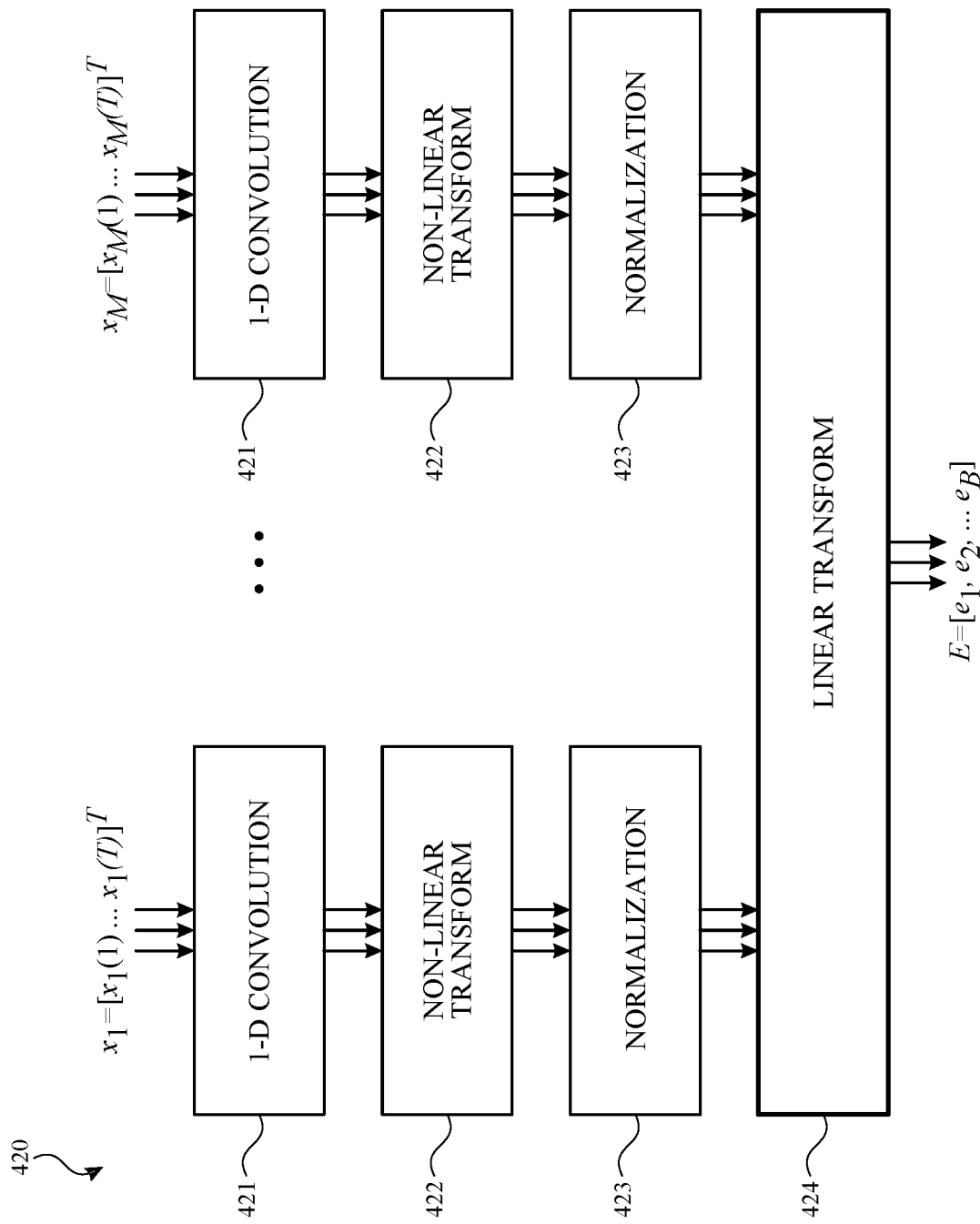

Another example architecture 420 of analysis network 401 is shown in FIG. 4C. The architecture 420 may include multiple 1-D convolution layers 421, multiple non-linear transformation layers 422, multiple normalization layers 423, and one or more linear transformation layers 424. The number of input 1-D convolution layers 421 may be based on the number of microphones of the microphone array 208a and/or input audio signals 301. For example, for M number of input audio signals 301, the architecture 420 may comprise M 1-D convolution layers 421 as shown in FIG. 4C. Each of the 1-D convolution layers may receive raw audio data of one input audio signal of the input audio signals 301, as shown in FIG. 4C. For example, as shown in FIG. 4C, raw audio data of a first input audio signal 301 $x_1=[x_1(1) \ldots x_1(T)]^T$ over T time periods is provided to a first 1-D convolutional layer 421, and similarly, raw audio data of an $M^{th}$ raw input audio signal 301 $x_M=[x_M(1) \ldots x_M(T)]^T$ is provided to the $M^{th}$ 1-D convolutional layer. The machine learning model 302 performs convolution operations at each of the 1-D convolution layers 421.

In one or more implementations, the machine learning model 302 has N sets of filter coefficients for each input audio signal 301, filter coefficients $h_{1,1}, \ldots h_{1,N}, h_{M,1}, \ldots h_{M,N}$, that have been learned during the training of the machine learning model 302 and are the coefficients for the first input audio signal to the $M^{th}$ microphone audio signal 301. At each of the non-linear transformation layers 422, the machine learning model 302 applies a non-linear activation function to the result of convolution operations, and at each of the normalization layers 423, the machine learning model 302 applies a normalization function to the results from the non-linear transformation layers 422. At the linear transformation layer 424, the machine learning model 302 may apply a linear function to the results of each of the normalization layers 423, resulting in the transformed audio data of the input audio signals 301 of dimension B, represented by $E=[e_1, e_2, \ldots e_B]$. The transformed audio data, $E=[e_1, e_2, \ldots e_B]$ of the input audio signals 301 is provided as an input to the extraction network 402.

Figure 4D:
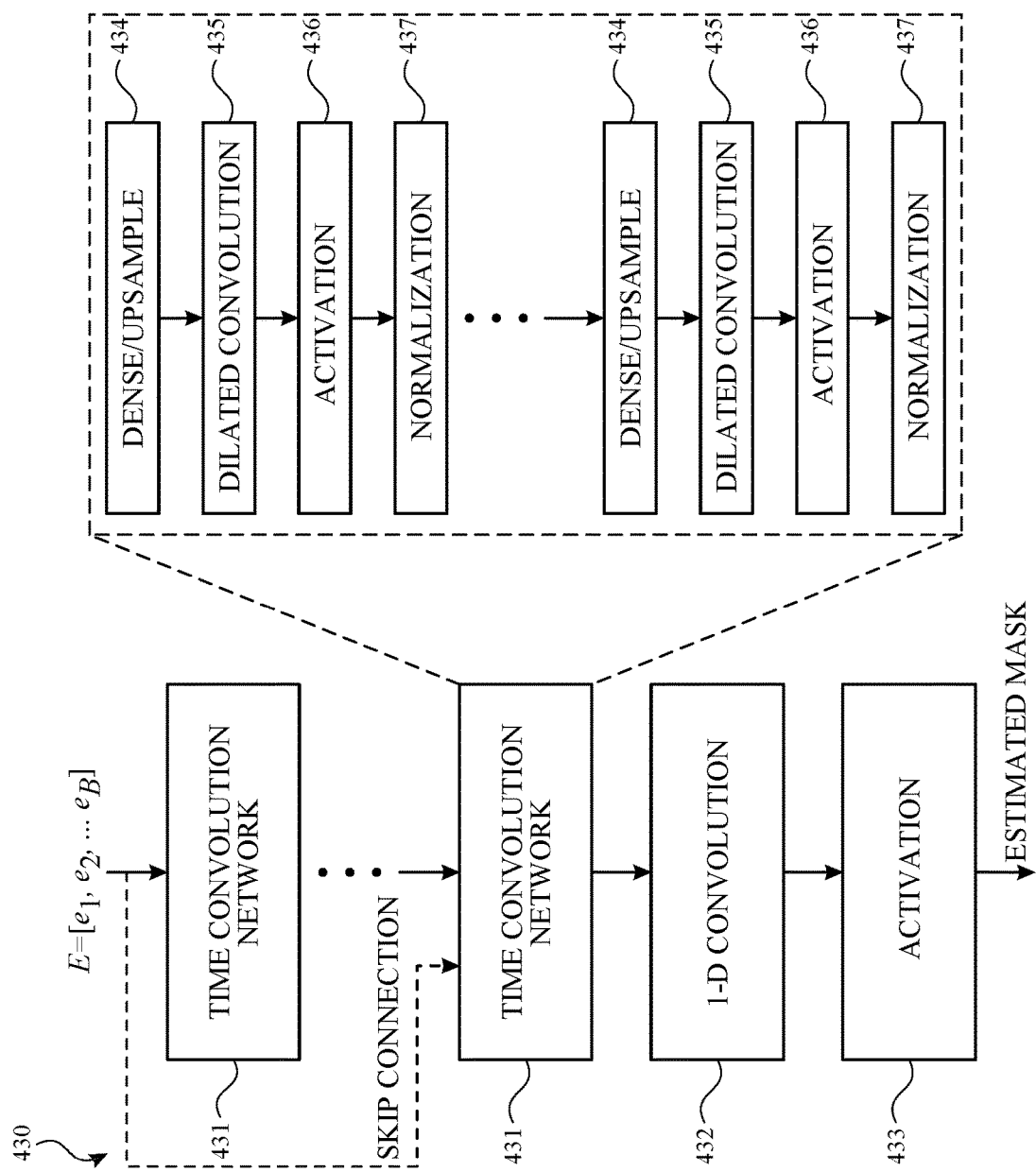

Returning to FIG. 4A, at the extraction network 402, the machine learning model 302 is trained to automatically learn and output filter masks to filter speech of speaker of interest present in the input audio signals 301. The outputted transformed data of the input audio signals 301 from the analysis network 401 and the outputted filter masks from the extraction network 402 may be combined to filter speech of a speaker of interest from the transformed data of the input audio signals 301. In one or more implementations, the combination may be a multiplication rule-based combination of the transformed data of the input audio signals and the filter masks. An example architecture 430 of the extraction network 402 is shown in FIG. 4D. The architecture 430 of the extraction network 402 may include one or more time convolution network layers 431, one or more 1-D convolution layers 432, and one or more activation function layers 433.

The one or more time convolution network layers 431 may be cascaded where an output of one time convolution network layer 431 may be an input to another time convolution network layer 431, as shown in FIG. 4D. Each time convolution network layer 431 may include one or more dense or upsample layers 434, one or more dilated convolution layers 435, one or more activation function layers 436, and one or more normalization layers 437. In one or more implementations, the one or more dense or upsample layers 434, the one or more dilated convolution layers 435, the one or more activation function layers 436, and the one or more normalization layers 437 may be arranged as shown in FIG. 4D.

At a first dense or upsample layer 434, the machine learning model 302 may be trained to upsample from the transformed audio data $E=[e_1, e_2, \ldots e_B]$, which is provided as an input to a first time convolution network layer 431, as shown in FIG. 4D. The output of the dense or upsample layers 434 is provided as an input to the dilation convolution layers 435, each of which may include one or more 1-D convolution layers with increasing dilation factors to capture an increasing context size of the input. The output of the dilation convolution layer(s) 435 may be provided to the activation function layer(s) 436 of the time convolution network layer(s) 431. The machine learning model 302 may apply an activation function at the activation function layer(s) 436, the output of which is provided to the normalization layer(s) 437, as shown in FIG. 4D.

The output of the last normalization layer 437 of the last time convolution network layer 431 is provided to the one or more 1-D convolution layers 432. At the 1-D convolution layer(s) 432, the machine learning model 302 performs 1-D convolution operations on the input to estimate masks, and provides the output to the one or more activation function layers 433. At the one or more activation function layers 433, the machine learning model 302 may apply a non-linear activation function to estimate the mask vector, referred to herein as filter mask.

Figure 4E:
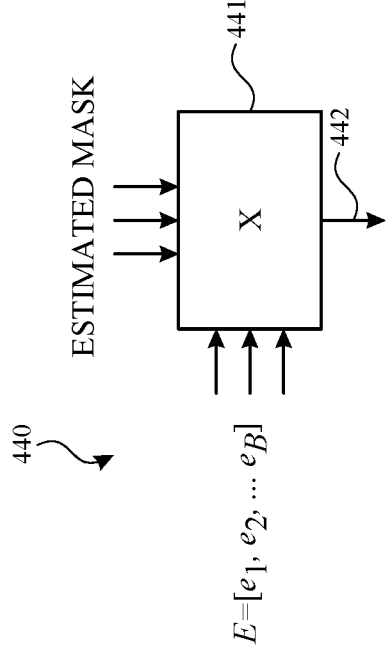

The outputted filter mask from the extraction network 402 and the transformed audio data of the input audio signals 301 may be provided to a combination network 404. At the combination network 404, the machine learning model 302 may be trained to combine the filter mask from the extraction network 402 with the transformed audio data of the input audio signals 301 to filter speech of a speaker of interest from the transformed data of the input audio signals 301. An example architecture 440 of the combination network 404 is shown in FIG. 4E. The architecture 440 of the combination network 404 may include one or more matrix multiplication layers 441, as shown in FIG. 4E. At the one or more matrix multiplication layers 441, the machine learning model 302 may be trained to combine the estimated filter mask with the transformed input audio data $E=[e_1, e_2, \ldots e_B]$ to filter speech of a speaker of interest from the transformed data of the input audio signals 301, and output audio data enhanced with speech of a speaker of interest (e.g., output 442).

Figure 4F:
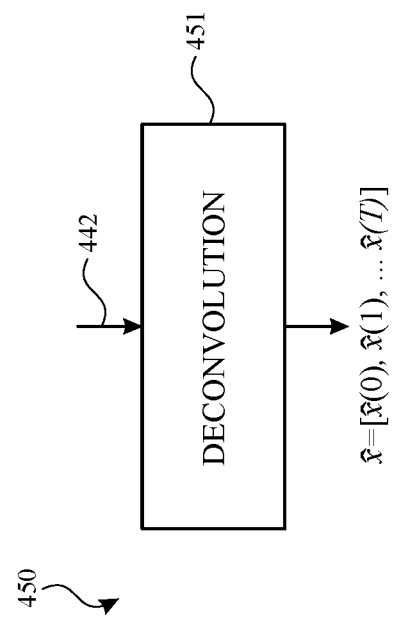

The output 442 of the combination at the combination network 404 is provided as an input to the synthesis network 403. Returning to FIG. 4A, at the synthesis network 403, the machine learning model 302 may be trained to reconstruct a waveform in the time-domain of audio data enhanced with the speech of the speaker of interest by converting the input filtered audio data enhanced with speech of a speaker of interest from the different domain into the time-domain. The machine learning model 302 may provide the reconstructed waveform as the output audio signal 303 to an application. For example, the machine learning model 302 may provide the output audio signal 303 to the application related to the cost function that the machine learning model 302 is being trained to optimize, such as an automatic speech recognition application, and the like. An example architecture 450 of the synthesis network 403 is shown in FIG. 4F. The architecture 450 of the synthesis network 403 may include one or more deconvolution layers 451. At the deconvolution layer(s) 451, the machine learning model 302 may perform transposed deconvolution operations on the inputs to the synthesis network 403 to estimate the coefficients $d_1, \ldots, d_N$, and, based on the coefficients, reconstruct a waveform of the audio data in the time domain, represented herein by $\hat{x}=[\hat{x}(0), \hat{x}(1), \ldots \hat{x}(T)]$. The machine learning model 302 may output the reconstructed waveform in the time-domain of the audio data enhanced with the speech of the speaker of interest, for example the output audio signal 303.

Figure 4G:
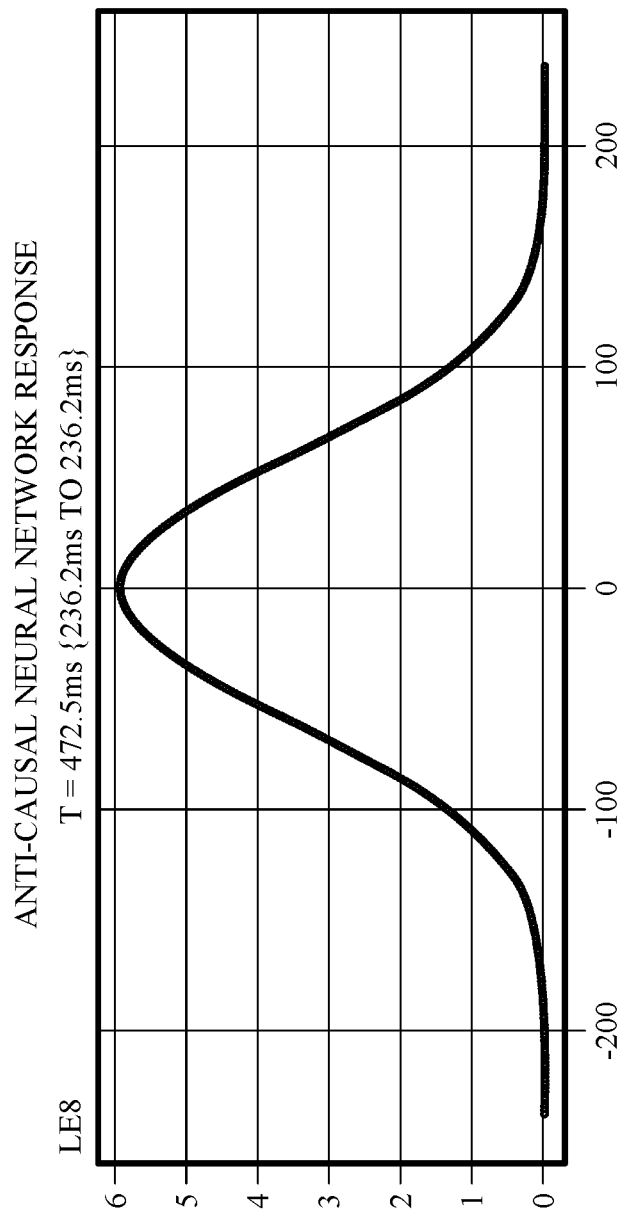
FIGS. 4G-4I are charts illustrating time responses of an anti-causal machine learning model, a causal machine learning model, and a low latency machine learning model in accordance with one or more implementations.
Figure 4H:
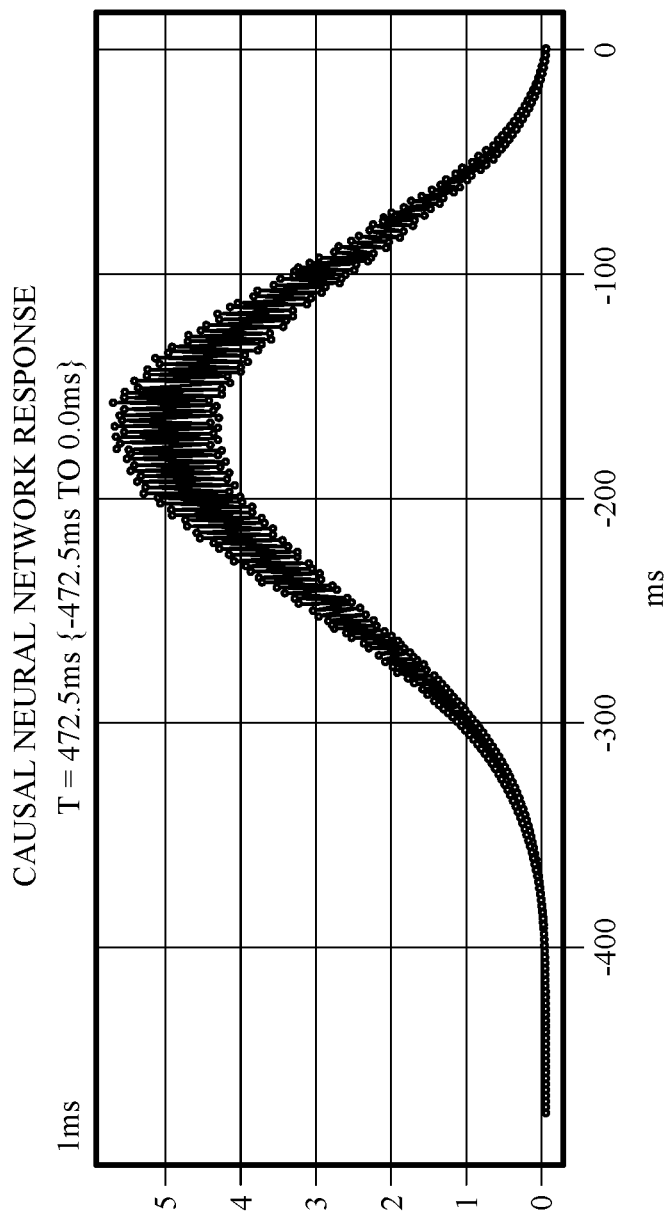

In one or more implementations, the machine learning model 302 may be configured to utilize asymmetrical convolutional filters instead of utilizing symmetrical convolution filters or forcing the convolution filters to only use information of past time samples (or frames). These filters are trained accordingly in an offline training session (e.g., during training phase) by forcing them to see only current and past time samples when inferring a speech sample, then used during runtime. Utilizing symmetrical filters may cause the machine learning model 302 to utilize audio data at future time samples (or frames) to compute a response at the current time sample (or frame), which results in high latency that may not satisfy the requirements of some applications, as real-time voice communication applications, telephony systems, and the like. An example response curve 400G of using the symmetrical and anti-causal filters is shown in FIG. 4G. Forcing the convolution filters to only use audio data of past time samples (or frames) to compute the response at the current time sample (or frame) may result in degraded performance as audio data at future time samples (or frames) is not utilized. An example response curve 400H of a causal system is shown in FIG. 4H.

Figure 4I:
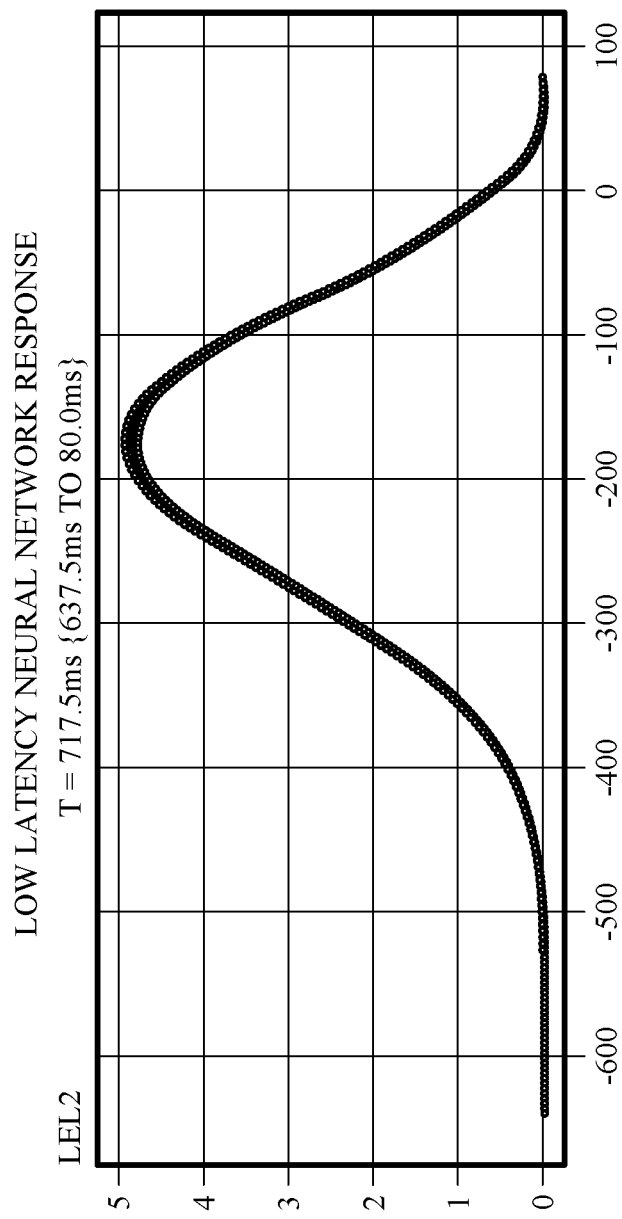

By utilizing asymmetrical convolution filters, the machine learning model 302 may be configured to utilize a small amount of future information (e.g., audio data at future time sample(s)) to compute the response at the current time sample (or frame), which improves performance and reduces latency to satisfy the requirements of various applications, such as real-time voice communication applications, telephony systems, and the like. An example, response curve 400I of utilize asymmetrical convolution filters is shown in FIG. 4I.

In one or more implementations, one or more components of the machine learning model 302, the analysis network 401, the extraction network 402, the combination network 404, and/or the synthesis network 403 may be implemented as software instructions, stored in the memory 204a, which when executed by the host processor 202a, cause the host processor 202a to perform particular function(s). In one or more implementations, one or more components of the machine learning model 302, the analysis network 401, the extraction network 402, the combination network 404, and/or the synthesis network 403 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), software (e.g., subroutines and/or code) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

In one or more implementations, the audio signals from the microphones of the microphone array 208a may be provided as inputs to a beamforming module and outputs of the beamforming module may be provided as inputs to the machine learning model 302.

Figure 5:
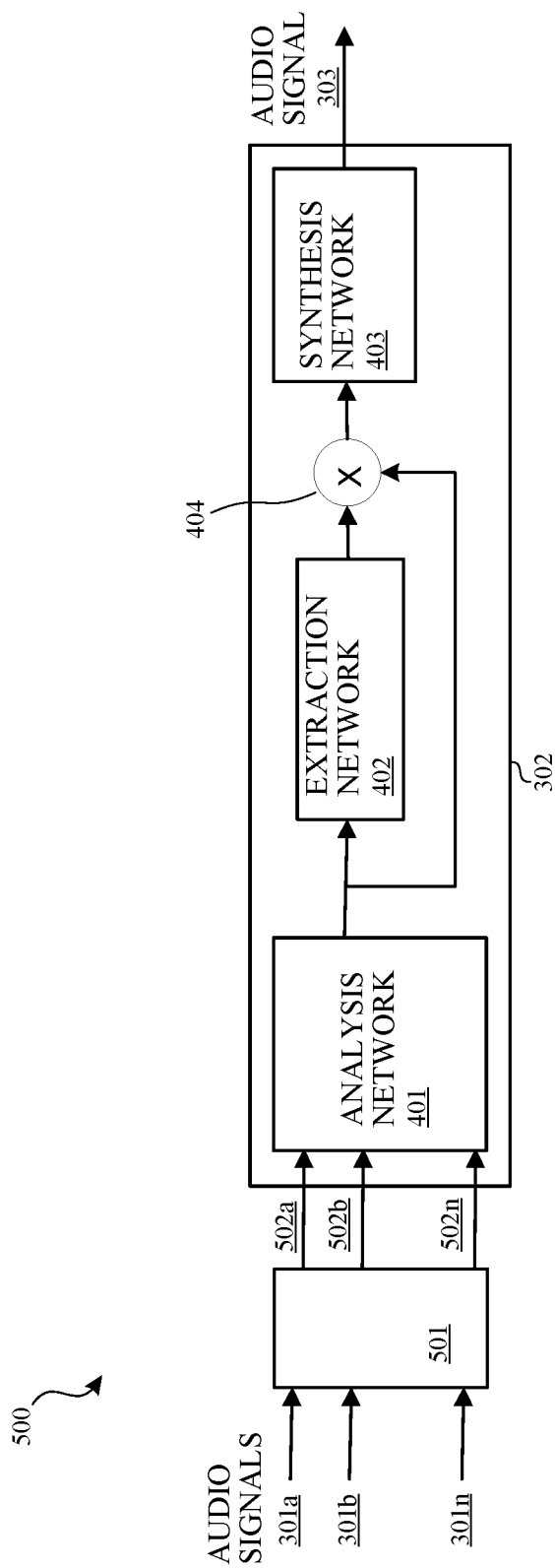
FIG. 5 illustrates a block diagram of an example architecture for outputting an enhanced time-domain speech of a user in accordance with one or more implementations.

FIG. 5 illustrates a block diagram of an example architecture 500 for processing time-domain audio signals to output a time-domain audio signal enhanced with speech of a speaker of interest in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 500 may include a beamforming module 501 and the machine learning model 302 of FIGS. 3 and 4. The beamforming module 501 may be configured to receive time-domain input audio signals 301 and output time-domain beamformed signals 502a, 502b, ... 502n, collectively referred to as beamformed signals 502. For explanatory purposes, the beamforming module 501 is illustrated as providing all of the input signals (e.g., the beamformed signals 502) to the machine learning model 302. However, the beamforming module 501 may be configurable to selectively provide one or more of the beamformed signals 502 as input, where the corresponding input audio signals 301 are provided as input for the beamforming module.

The beamforming module 501 may be configured to separate the input audio signals 301 based on spatial information of the input audio signals 301 and the expected position of the speaker of interest (e.g., user of the device). For example, the beamforming module 501 may be configured to separate the input audio signals 301 based on the direction of arrival of each of the input audio signals corresponding to the expected position of the speaker of interest (e.g., user of the electronic device 102). The beamforming module 501 may associate at least one of the beamformed signals 502, such as the beamformed signal 502a, with the spatial information corresponding to the expected position of the speaker of interest as a target beamformed signal 502a.

The beamformed signals 502 are provided as inputs to the machine learning model 302 and the machine learning model 302 may be configured to output the output audio signal 303 as shown in FIG. 5. For example, the analysis network 401 may be configured to receive the beamformed signals 502 as inputs and output transformed data of the beamformed signals 502. The transformed data of the beamformed signals 502 may be provided as input to the extraction network 402, and the extraction network 402 may be configured to output filter masks. The combination (e.g., multiplication rule-based combination) of the transformed data of the beamformed signals 502 with filter masks at the combination network 404 may output audio data enhanced with speech of speaker of interest. The audio data enhanced with speech of speaker of interest may be provided as input to the synthesis network 403 to transform the received audio data into time-domain. The synthesis network 403 may be configured to output the output audio signal 303 that includes audio data enhanced with speech of speaker of interest in a time domain waveform.

In one or more implementations, one or more components of the beamforming module 501, the machine learning model 302, the analysis network 401, the extraction network 402, the combination network 404, and/or the synthesis network 403 may be implemented as software instructions, stored in the memory 204a, which when executed by the host processor 202a, cause the host processor 202a to perform particular function(s). In one or more implementations, one or more components of the beamforming module 501, the machine learning model 302, the analysis network 401, the extraction network 402, the combination network 404, and/or the synthesis network 403 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), software (e.g., subroutines and/or code) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
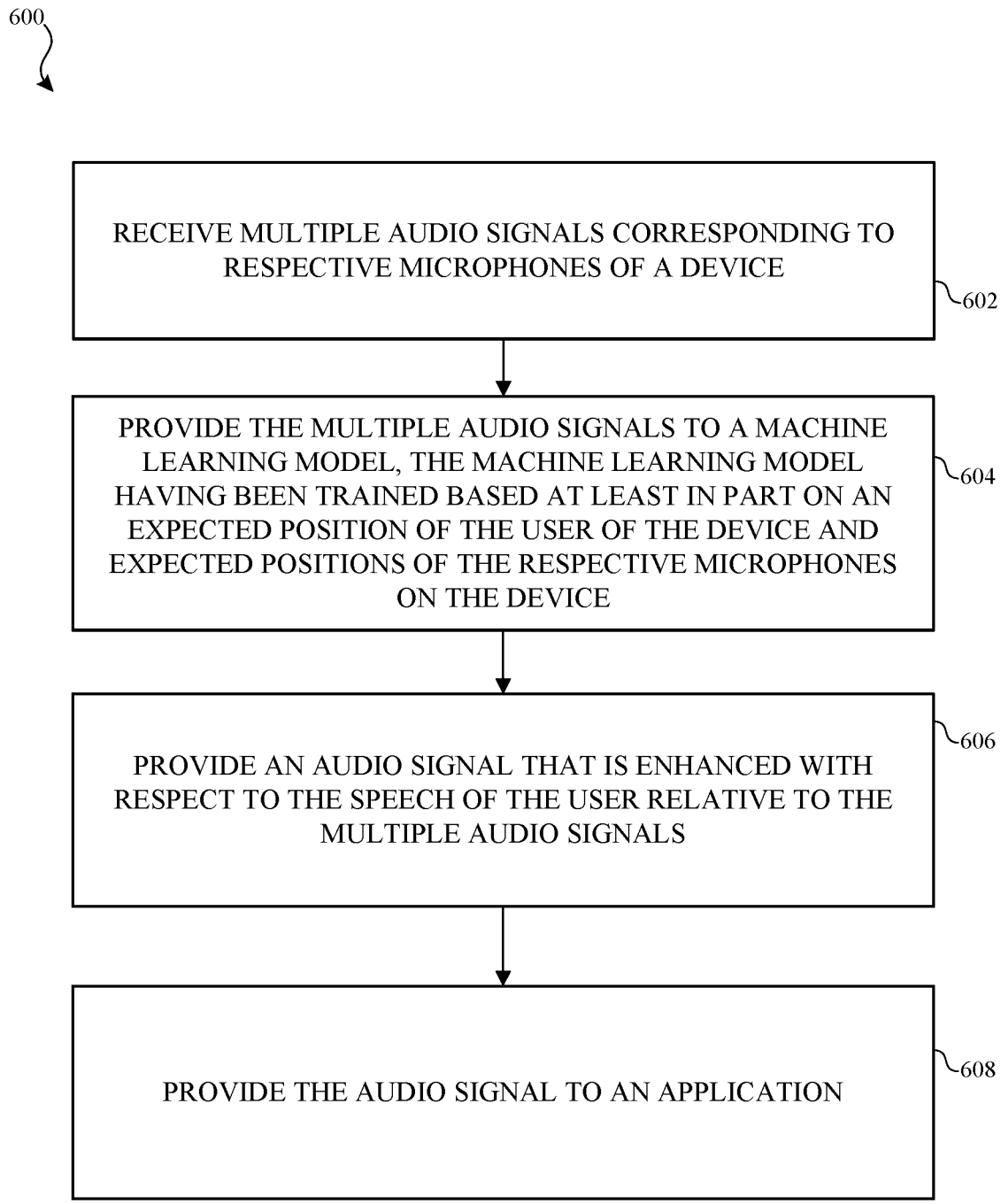
FIG. 6 illustrates a flow diagram of example process for outputting an enhanced time-domain speech of a user in accordance with one or more implementations.

FIG. 6 illustrates a flow diagram of example process for outputting an audio signal enhanced with respect to speech of a speaker of interest relative to other audio data of the input audio signals in accordance with one or more implementations. For explanatory purposes, the process 600 is primarily described herein with reference to the electronic device 102 of FIG. 1. However, the process 600 is not limited to the electronic device 102 of FIG. 1, and one or more blocks (or operations) of the process 600 may be performed by one or more other components and other suitable devices (e.g., the wireless audio input/output device 103). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The host processor 202a of the electronic device 102 receives multiple audio signals corresponding to respective microphones (e.g., microphones of the microphone array 208a) of the electronic device 102 (602). At least one of the multiple audio signals may include speech of a user of the electronic device 102 (e.g., a speaker of interest). In or more implementations, each of the received multiple audio signals is a time-domain waveform. The host processor 202a of the electronic device 102 provides the multiple audio signals to a machine learning model (e.g., the machine learning model 302), the machine learning model having been trained based at least in part on an expected position of a user of the electronic device 102 (e.g., the speaker of interest) and expected positions of the respective microphones on the electronic device (604).

The machine learning model 302 may have been trained to optimize an application-dependent cost function with respect to the waveform. As described above, examples of such application-dependent cost function include cost functions configured to maximize various speech signal metrics including, but not limited to, signal-to-distortion ratio (SDR), signal-to-interference ratio (SIR), signal-to-noise ratio enhancement (SNRE), signal-to-artifacts ratio (SAR), short-time objective intelligibility (STOI), perceptual evaluation of speech quality (PESQ), automatic speech recognition (ASR), and the like.

The host processor 202a of the electronic device 102 may be configured to provide an audio signal that is enhanced with respect to the speech of the user relative to the multiple audio signals (606). The audio signal (e.g., output audio signal 303) is a waveform output from the machine learning model that is enhanced with respect to the speech of the user relative to the multiple audio signals. The electronic device 102 may be configured to provide the audio signal (e.g., output audio signal 303) in response to providing the multiple received audio signals to the machine learning model (e.g., machine learning model 302). The output waveform from the machine learning model (e.g., machine learning model 302) may be a time-domain waveform. In one or implementations, the output waveform from the machine learning model may include voice and/or speech of the user exclusive of other audio data present in the received multiple audio signals.

The host processor 202a of the electronic device 102 may be configured to provide the audio signal to an application (608). The application may be the application related to the cost function for which the machine learning model (e.g., machine learning model 302) is trained to optimize. For example, the application may be an automatic speech recognition application, a real-time audio and/or video communication application, telephony applications, assistive and/or augmented hearing applications, augmented reality applications, computer generated reality applications, and the like.

As described above, one aspect of the present technology is the gathering and use of data available from specific sources and legitimate sources for providing user information in association with processing audio signals. The present disclosure contemplates that in some instances, this gathered data may include personal information data that uniquely identifies or can be used to identify a specific person. Such personal information data can include demographic data, location-based data, online identifiers, telephone numbers, email addresses, home addresses, date of birth, data or records relating to a user's health or level of fitness (e.g., vital signs measurements, medication information, exercise information), or any other personal information.

The present disclosure recognizes that the use of such personal information data, in the present technology, can be used to the benefit of users. For example, the personal information data can be used for providing information corresponding to a user in association with processing audio and/or non-audio signals. Accordingly, use of such personal information data may facilitate transactions (e.g., on-line transactions) and/or interactions with an electronic device (e.g., interactions with applications executing on the electronic device). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing information corresponding to a user in association with processing audio and/or non-audio signals, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 7:
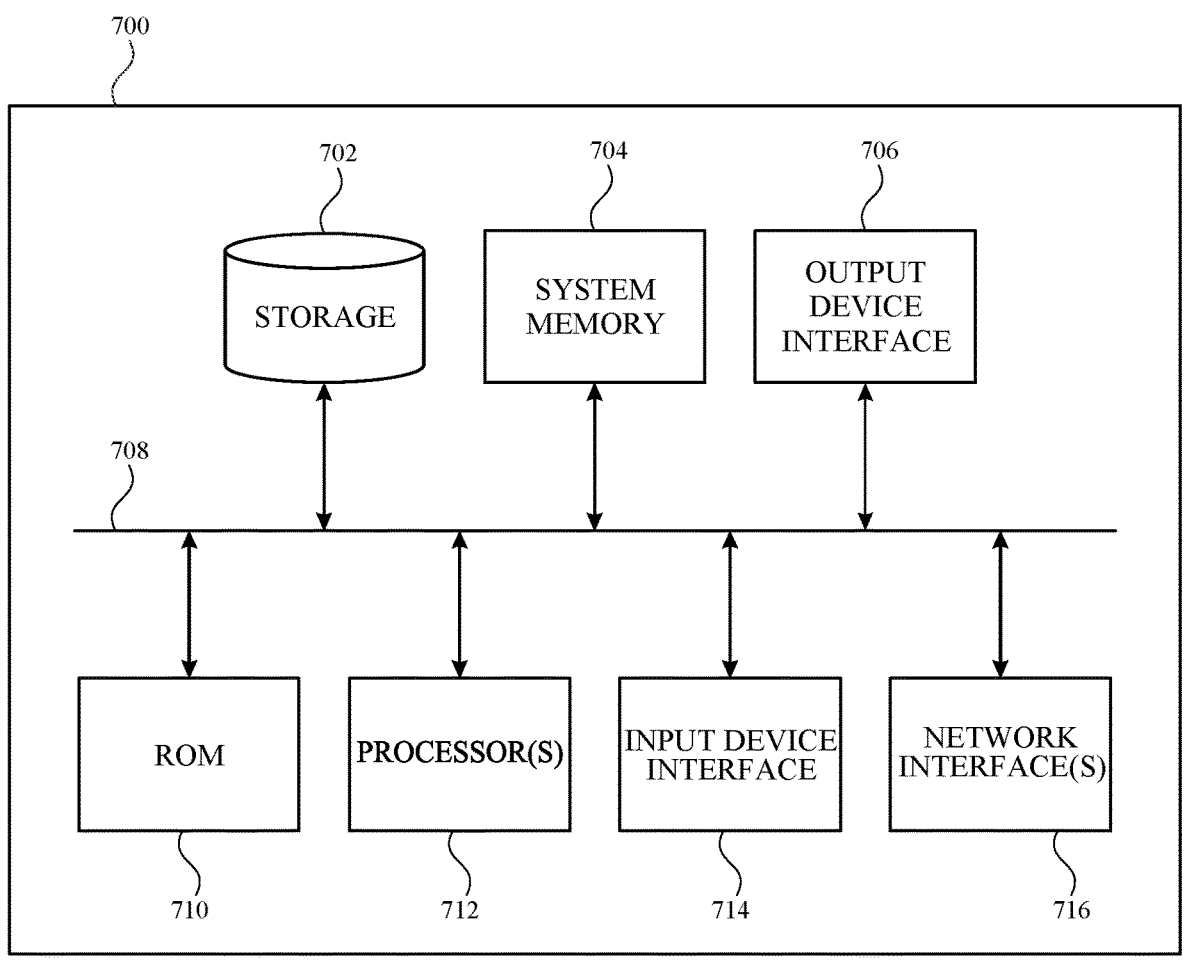
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the devices 102, 104, and/or the server 108 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the server 108 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving multiple audio signals corresponding to respective microphones of a device, at least one of the multiple audio signals comprising speech of a user of the device;
providing the multiple audio signals to a machine learning model, the machine learning model having been trained based at least in part on an expected position of the user of the device and expected positions of the respective microphones on the device; and
providing, responsive to the providing of the multiple audio signals to the machine learning model, an audio signal that is enhanced with respect to the speech of the user relative to the multiple audio signals, wherein the audio signal is a waveform output from the machine learning model.

2. The method of claim 1, wherein the machine learning model having been further trained to optimize an application-dependent cost function with respect to the waveform.

3. The method of claim 2, further comprising:
providing the audio signal to an application related to the application-dependent cost function.

4. The method of claim 1, wherein the waveform comprises a voice of the user exclusive of other audio data present in the received multiple audio signals.

5. The method of claim 1, wherein the machine learning model is a deep neural network (DNN).

6. The method of claim 1, wherein the waveform is a time-domain waveform.

7. The method of claim 1, wherein each of the multiple audio signals comprise a time-domain waveform.

8. The method of claim 1, wherein the machine learning model having been further trained to transform audio data of the multiple audio signals into a different domain from time-domain.

9. The method of claim 8, wherein the machine learning model having been further trained to combine the transformed audio data with one or more estimated filter masks to enhance the audio data with respect to the speech of the user relative to the multiple audio signals.

10. The method of claim 9, wherein the machine learning model having been further trained to transform the audio data enhanced with respect to the speech of the user relative to the multiple audio signals into time-domain and output the waveform comprising the audio data enhanced with respect to the speech of the user relative to the multiple audio signals in the time-domain.

11. The method of claim 1, wherein the multiple received audio signals are beamformed signals based on signals of the microphones of the device.

12. A device comprising:
at least two or more microphones;
a processor; and
a memory including instructions that, when executed by the processor, causes the processor to:
receive multiple audio signals corresponding to respective microphones of the at least two or more microphones, at least one of the multiple audio signals comprising speech of a user of the device;
provide the multiple audio signals to a machine learning model, the machine learning model having been trained based at least in part on an expected position of the user of the device and expected positions of the respective microphones on the device; and
provide an audio signal that is enhanced with respect to the speech of the user relative to the multiple audio signals, wherein the audio signal is a waveform output from the machine learning model.

13. The device of claim 12, wherein the machine learning model having been further trained to optimize an application-dependent cost function with respect to the waveform.

14. The device of claim 12, wherein the waveform comprises a voice of the user exclusive of other audio data present in the received multiple audio signals.

15. The device of claim 12, wherein the machine learning model is a deep neural network (DNN).

16. The device of claim 12, wherein the waveform is a time-domain waveform.

17. The device of claim 12, wherein each of the multiple audio signals comprise a time-domain waveform.

18. The device of claim 12, wherein the machine learning model having been further trained to transform audio data of the multiple audio signals into a different domain from time-domain.

19. The device of claim 18, wherein the machine learning model having been further trained to combine the transformed audio data with one or more estimated filter masks to enhance the audio data with respect to the speech of the user relative to the multiple audio signals.

20. A computer program product comprising code, stored in a non-transitory computer-readable storage medium, the code comprising:
code to receive multiple audio signals corresponding to respective microphones of a device, at least one of the multiple audio signals comprising speech of a user of the device;
code to provide the multiple audio signals to a machine learning model, the machine learning model having been trained based at least in part on an expected position of the user of the device, expected positions of the respective microphones on the device; and
code to provide, to an application, an audio signal that is enhanced with respect to the speech of the user relative to the multiple audio signals, wherein the audio signal is a waveform output from the machine learning model.

* * * * *